Patented Nov. 6, 1951

2,574,396

UNITED STATES PATENT OFFICE 2,574,396

INTERMEDIATES AND PROCESS USEFUL IN THE PRODUCTION OF BIS-DEHYDRODO-ISYNOLIC ACID

William S. Johnson, Madison, Wis., and Robert P. Graber, Minneapolis, Minn.

No Drawing. Application July 23, 1949, Serial No. 106,494

3 Claims. (Cl. 260—520)

The present invention relates to the bisdehydrodoisynolic acid (IX) art and is directed to improved processes of preparing the dehydro acid and related alkyl ethers and esters and to intermediates thereof having utility in the hormone field.

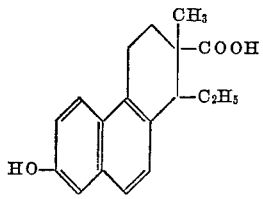

The dehydro acid (IX) known chemically as 1 - ethyl - 2 - methyl - 7 - hydroxy - 1,2,3,4-tetrahydrophenanthrene-2-carboxylic acid, has attracted attention in the hormone field because it is one of the most potent estrogens known. In a series of brilliant studies Miescher, Heer, and Billeter obtained the dehydro acid both as a degradation product of natural equilenin and by total synthesis. Miescher, Helv. Chim. Acta. 27, 1727 (1944); Heer, Billeter, and Miescher, ibid. 28, 991, 1342 (1945). More recently Anner and Miescher announced an improved synthesis involving about ten steps from 1-aminonaphthalene-6-sulfonic acid (Cleve's acid) to the methyl ether (VIII). Anner and Miescher, Helv. Chim. Acta. 29, 586 (1946).

The present invention is directed to a facile total synthesis. Johnson and Graber, J. Am. Chem. Soc. 70, 2612 (1948). It comprises the condensation of di-lower-alkyl succinate with 2 - propionyl - 6 - methoxynaphthalene; catalytic hydrogenation of the resulting condensation product to form β - carboxy - γ - (6 - methoxy-2-naphthyl)-caproic acid; cyclization of the caproic acid to form 1-ethyl-4-keto-7-methoxy-1,2,3,4 - tetrahydrophenanthrene - 2 - carboxylic acid; hydrogenation of the keto acid to form 1 - ethyl - 7 - methoxy - 1,2,3,4 - tetrahydrophenanthrene-2-carboxylic acid, and methylation of the latter product to form α-bisdehydrodoisynolic acid methyl ether. The process may be illustrated by the following formulas.

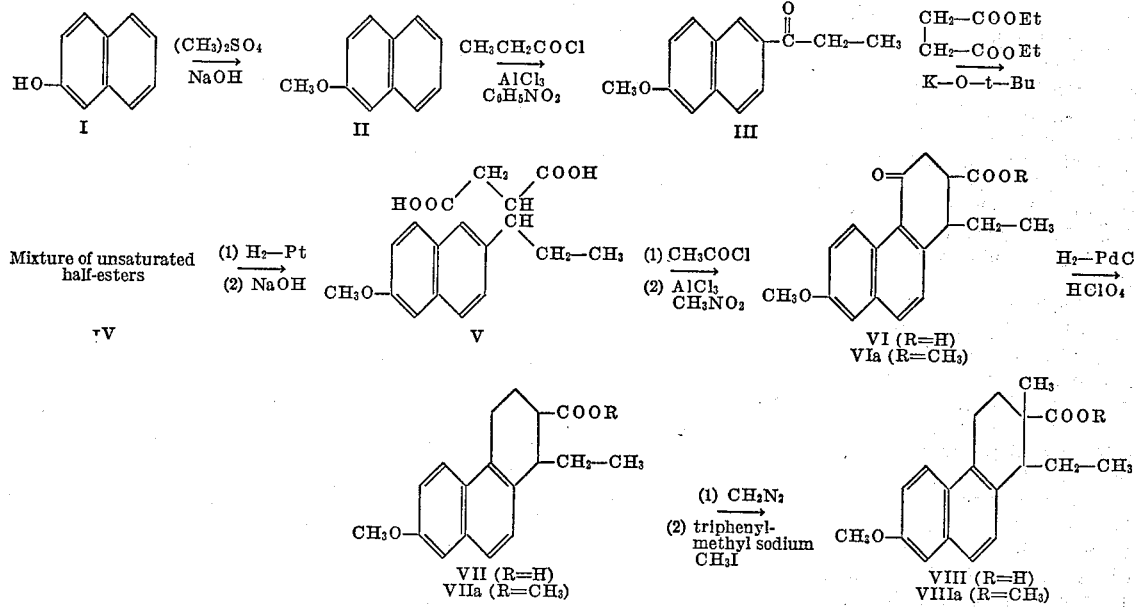

*2-propionyl-6-methoxynaphthalene (III).*—A solution of 224 g. (1.68 moles) of anhydrous aluminum chloride in one liter of freshly distilled nitrobenzene is cooled to 0–2° C. and a solution of 212.2 g. (1.343 moles) of β-methoxynaphthalene (II), prepared from β-naphthol I by conventional methods, Stork, J. Am. Chem. Soc., 69, 576 (1947), in 336 cc. of nitrobenzene is added dropwise with cooling and stirring. The resulting solution is further cooled to −3° C. and 143 g. (1.54 moles) of propionyl chloride added dropwise. The reaction mixture is then stored in ice for about 96 hours, after which it is decomposed by pouring onto 4 kg. of ice and 450 cc. of concentrated hydrochloric acid. The nitrobenzene is removed by steam distillation of the total mixture and the organic material, obtained by extraction with benzene, is distilled to give a light yellow distillate B. P. 145–162° C. at 0.05–0.06 mm., which crystallizes to a solid M. P. 97.5–107° C. One recrystallization from methanol gives the desired product (III) with a melting point of about 110.5–111.5° C. Haworth and Sheldrick, J. Chem. Soc., 864 (1934).

*Unsaturated half esters (IV)*.—The condensation of the 2-propionyl-6-methoxynaphthalene (III) with diethyl succinate is carried out as follows. A solution of potassium tert-butoxide is first prepared by dissolving 42.5 g. (1.09 moles) of potassium in 1100 cc. of sodium-dried tert.-butyl alcohol. To this solution 244 g. (1.40 moles) of diethyl succinate and 201.5 g. (0.94 mole) of the 2-propionyl-6-methoxynaphthalene (III) prepared as above is added rapidly. The mixture is heated under reflux in an atmosphere of nitrogen for about forty minutes, cooled, and 610 cc. of 2 N hydrochloric acid added. After removal of most of the tert-butyl alcohol in vacuo, the organic material is extracted with ether. The ether extract is washed thoroughly with water and the acidic material extracted with 5% sodium carbonate solution. Six 200 cc. portions of the sodium carbonate solution suffices to remove the major portion of the crude half ester mixture (IV), which is then isolated by acidification of the sodium carbonate solution followed by extraction with ether. The ether extract is dried over sodium sulfate, and the ether removed by evaporation to give the desired product (IV) as a viscous yellow-brown oil.

Investigations show the crude half ester product (IV) upon saponification to give a mixture of materials which include 3-carboxy-4-(6-methoxy-2-naphthyl)-4-hexeno acid M. P. 166° C.; and the trans and cis forms of 3-carboxy-4-(6-methoxy-2-naphthyl)-3-hexeno acid with respective M. P.'s of 154° C. and 172° C. Investigations also show that the 4-hexenoic acid M. P. 166° C. hydrogenates readily in presence of a platinum oxide catalyst to form the caproic acid (V).

*β-Carboxy-γ-(6-methoxy-2-naphthyl)-caproic acid (V)*.—The hydrogenation of the crude half-ester mixture is carried out as follows. About 258.7 g. of the oily unsaturated half-ester mixture is hydrogenated in the presence of about 3 g. of platinum oxide in 360 cc. of ethanol using a Parr shaker apparatus and a starting pressure of about 32 lbs. After about nine hours the absorption of the hydrogen ceases. The mixture is filtered to remove the catalyst and the solvent removed in vacuo to give a light reddish-brown oily product. To this material is added 1800 cc. of 10 per cent sodium hydroxide solution and the mixture heated on a steam bath with stirring. After about twenty minutes the oily mixture completely dissolves and in about twenty-five minutes insoluble crystalline sodium salts begin to separate. The mixture is allowed to stand for about five hours and is then cooled and filtered.

The filtrate resulting from above operation is next acidified with dilute hydrochloric acid. A light brown oily mixture of acids is obtained which after separation from the aqueous mixture and crystallization from ethyl acetate-petroleum ether (boiling range 60–68° C.) gives the desired product (V) as light buff-colored needles with a melting point of about 163–165° C.

*1-ethyl-4-keto-7-methoxy-1,2,3,4-tetrahydrophenanthrene-2-carboxylic acid (VI)*.—The cyclization of the β-carboxy-γ-(6-methoxy-2-naphthyl)-carboxylic acid (V) is carried out as follows. About 50.0 g. (0.158 mole) of the caproic acid (V) is heated under reflux for five hours with 120 cc. of acetyl chloride. After removal of the acetyl chloride by co-distillation with four 120-cc. portions of dry benzene, the anhydride is obtained as a light yellow glassy oil. The anhydride is dissolved in 200 cc. of freshly distilled nitromethane and the resulting solution added dropwise with stirring to a mixture of 48.5 g. (0.364 mole) of aluminum chloride in 200 cc. of nitromethane. An additional 50 cc. of nitromethane is used to rinse the dropping funnel. (Nitrobenzene may also be used in place of nitromethane.) During the addition of the anhydride solution which, with the proportions used, takes about 3–4 hours the reaction mixture is kept at −15° to −16° C. with an ice-salt bath. Stirring and cooling are continued for an additional six hours after which the mixture is stored in a flask in an ice-salt bath at −15° to −18° C. for four days.

The reaction mixture is decomposed by pouring into 1 kg. of ice and 250 cc. of concentrated hydrochloric acid. Some solid material present in the acidic mixture is brought into solution by the addition of 400 cc. each of ether and ethyl acetate. The aqueous layer is separated and extracted twice with ether and the resulting ether extract added to the nitromethane-ether-ethyl acetate layer. After washing with water the solvent layer is extracted with three 250 cc. portions of 5% sodium carbonate solution. The sodium carbonate extracts are acidified with dilute hydrochloric acid and extracted with a chloroform-ethyl acetate mixture. After drying over sodium sulfate, the solution is concentrated to 150 cc. at which point a granular crystalline material begins to separate. The solution is cooled to room temperature and the light brown granular crystalline material which separates is collected on a filter and washed with two 15 cc. portions of ethyl acetate. Without drying this material is then recrystallized from ethanol and gives the desired product (VI) as light buff-colored fine prisms with a melting point of about 211.5–216.5° C.

*1-ethyl-7-methoxy-1,2,3,4-tetrahydrophenanthrene-2-carboxylic acid (VII)*.—A suspension of 2.5 g. of the pure ketotetrahydrophenanthrene-carboxylic acid (VI) and 50 cc. of acetic acid is hydrogenated with 0.35 g. of 30 per cent palladium-charcoal in the presence of 2.0 cc. of 60 per cent perchloric acid. Linstead and Thomas, J. Chem. Soc., 1130 (1940); Rosenmund and Karg, Ber. 75, 1850 (1942). After stirring for about eight hours two molecular equivalents of hydrogen are absorbed and the reaction is interrupted at this point. The rate of absorption is very low near the end of the reaction and the final solution contains a considerable quantity of colorless crystalline material. Boiling the suspension on a steam bath after addition of 30 cc. ethyl acetate brings the solid into solution. The hot solution is filtered and the catalyst washed thoroughly with hot ethyl acetate. The filtrate is evaporated to about 25 cc. in a current of air, and 30 cc. of water is added which causes a crystalline material to separate. The volume is again reduced to about 10–15 cc. and to the resulting suspension is added 100 cc. water and the organic material extracted with ethyl acetate. The ethyl acetate extract is washed thoroughly with water, then once with saturated salt solution and finally dried over magnesium sulfate. Evaporation of the solvent gives a yellow partly crystalline residue which after recrystallization from acetone gives the desired product (VII) as colorless prisms with a melting point of about 205–206.5° C.

*Bisdehydrodoisynolic acid methyl ether (VIII).*—About 1.629 g. of the tetrahydrophenanthrenecarboxylic ester (VIIa) prepared from 1.545 g. of the pure acid (VII) with diazomethane, is treated in 60 ml. of sodium-dried ether with 25 cc. of a 0.428 N ethereal solution of sodium triphenylmethyl. After standing at room temperature in a glass stoppered flask in an atmosphere of nitrogen for about ½ hour, 5 cc. of methyl iodide is added. To the resulting light yellow solution containing a voluminous buff-colored precipitate 25 cc. of water is added. The layers are separated and the yellow ether layer is washed with three 25 cc. portions of water. The combined water washings are extracted with ether which is added to the ether layer. Evaporation of the ether, after washing once with saturated salt solution and drying over magnesium sulfate, gives a yellow oil containing the ether (VIIIa) This oil product is next treated with 50 cc. of alcoholic potassium hydroxide (2.5 g. potassium hydroxide, 2.5 cc. of water and 50 cc. of 95 per cent alcohol) under reflux for about 12 hours. The solution is evaporated in a current of air and the partially crystalline residue formed is dissolved in a mixture of 30 cc. each of ether and water. The layers are separated and the ether layer washed with three 15 cc. portions of water. Acidification of the combined aqueous extracts with hydrochloric acid followed by extraction with three 50 cc. portions of ether which are combined and dried over magnesium sulfate gives, after evaporation of the ether, a buff-colored granular crystalline solid with a melting point of about 222.5–224.5° C. Recrystallization of this material from acetone gives the desired product (VIII) as colorless prisms with a melting point of about 230–231.3° C.

Various derivatives of the products shown above may be prepared by standard procedures available in the art. The methyl esters of the acids (VI), (VII) and (VIII), for example, may be prepared by treating the acids in ethereal solution with diazomethane and recrystallization from methanol. The methyl ester (VIa) of the keto acid (VI) has a melting point of 127.5–129.5° C., and the methyl ester (VIIa) of the tetrahydrophenanthrene-carboxylic acid (VII) has a melting point of 101–102° C. Other di-lower-alkyl esters and ethers (ethyl, propyl, tert. butyl, etc.) may also be prepared by various procedures known in the art.

The novel synthesis of the present invention employs as its starting material β-naphthol, a readily available and relatively inexpensive chemical. In addition to this advantage over previously proposed syntheses, the process of the present invention is executed in fewer steps than required in the prior art processes. Of utmost importance from a commercial point of view, the steps employed in the synthesis of the present invention lend themselves readily to large scale production and may be carried out easily as ordinary laboratory operations.

It will be understood that the above detailed examples are for illustrative purposes only. Various modifications falling within the scope of the invention will be apparent to those skilled in the art.

We claim:

1. The product, 1-ethyl-4-keto-7-methoxy-1,2,3,4 - tetrahydrophenanthrene - 2 - carboxylic acid.

2. The process which comprises condensing diethyl succinate with 2-propionyl-6-methoxynaphthalene, hydrogenation of the resulting condensation product to form β-carboxy-γ-(6-methoxy-2-naphthyl)-caproic acid, and cyclization of the caproic acid to form 1-ethyl-4-keto-7-methoxy-1,2,3,4 - tetrahydrophenanthrene - 2 - carboxylic acid.

3. Products selected from the group consisting of 1-ethyl-4-keto-7-oxy-1,2,3,4-tetrahydrophenanthrene-2-carboxylic acid and lower alkyl esters thereof.

WILLIAM S. JOHNSON.
ROBERT P. GRABER.

REFERENCES CITED

The following references are of record in the file of this patent:

UNITED STATES PATENTS

| Number | Name | Date |
|---|---|---|
| 2,429,166 | Miescher et al. | Oct. 14, 1947 |

OTHER REFERENCES

Bachman et al., Chem. Abstracts, vol. 35, col. 2154 (1941).

Anner et al., Chem. Abstracts, vol. 41, col. 140 (1947).